(12) United States Patent
Wimmer et al.

(10) Patent No.: US 11,618,577 B2
(45) Date of Patent: Apr. 4, 2023

(54) DROGUE BRIDLE CONNECTION ASSEMBLY FOR EJECTION SEATS

(71) Applicant: AMI Industries, Inc., Colorado Springs, CO (US)

(72) Inventors: Dustin J. Wimmer, Colorado Springs, CO (US); Glen Shaw, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 277 days.

(21) Appl. No.: 17/032,464

(22) Filed: Sep. 25, 2020

(65) Prior Publication Data
US 2022/0097855 A1 Mar. 31, 2022

(51) Int. Cl.
*B64D 25/10* (2006.01)
*B64D 17/72* (2006.01)

(52) U.S. Cl.
CPC ........... *B64D 25/10* (2013.01); *B64D 17/725* (2013.01)

(58) Field of Classification Search
CPC .............................. B64D 25/10; B64D 17/725
See application file for complete search history.

(56) References Cited

U.S. PATENT DOCUMENTS

| 2,527,020 | A | | 10/1950 | Martin | |
|---|---|---|---|---|---|
| 2,969,212 | A | * | 1/1961 | Martin | B64D 25/10 244/141 |
| 2,569,638 | A | | 2/1962 | Martin | |
| 3,861,625 | A | * | 1/1975 | Sadler | B64D 25/10 244/122 AD |
| 4,637,577 | A | | 1/1987 | Miseyko et al. | |
| 4,765,570 | A | | 8/1988 | Herndon | |

FOREIGN PATENT DOCUMENTS

| FR | 2137715 | 12/1972 |
|---|---|---|
| GB | 888751 | 2/1962 |

OTHER PUBLICATIONS

United Kingdom Intellecutal Property Office; United Kingdom Search Report dated Apr. 27, 2022 in Application No. GB2113734.4.

* cited by examiner

*Primary Examiner* — Timothy D Collins
*Assistant Examiner* — Brendan Kroger Schneider
(74) *Attorney, Agent, or Firm* — Snell & Wilmer L.L.P.

(57) ABSTRACT

A drogue bridle attachment assembly may comprise a housing, a lock pin, jackscrew gear pin, and a drive gear pin. The housing may define a bridle opening. The lock pin may be configured to translate into the bridle opening. The jackscrew gear pin may include a threaded portion and a gear portion. The threaded portion may engage a threaded opening in the lock pin. The drive gear pin may include a drive gear portion intermeshed with the gear portion of the jackscrew gear pin.

14 Claims, 5 Drawing Sheets

DROGUE BRIDLE CONNECTION ASSEMBLY FOR EJECTION SEATS

FIELD

The present disclosure relates to ejection seats, and more specifically, to drogue bridle connection assemblies and methods of installing drogue parachutes in ejection seats.

BACKGROUND

During ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

The drogue bridle attaches the drogue parachute to the ejection seat. The drogue bridle is usually routed around the rocket cutout in the seatback such that the seatback can be installed into the cockpit with the rocket already attached to the actuator. The bridle is folded and tacked along the seatback frame to prevent interference with other ejection system structures. This routing and tacking tends to be tedious and time consuming for installers and maintainers.

SUMMARY

A drogue bridle attachment assembly is disclosed herein. In accordance with various embodiments, the drogue bridle attachment assembly may comprise a housing, a lock pin, a jackscrew gear pin, and a drive gear pin. The housing may define a bridle opening and the lock pin may be configured to translate into the bridle opening. The jackscrew gear pin may include a threaded portion and a gear portion. The threaded portion may be configured to engage a threaded opening in the lock pin. The drive gear pin may include a drive gear portion intermeshed with the gear portion of the jackscrew gear pin.

In various embodiments, the drive gear pin may be configured to rotate about a first axis, and the jackscrew gear pin may be configured to rotate about a second axis. The second axis may be approximately perpendicular to the first axis. In various embodiments, a head of the drive gear pin may define a tool opening.

In various embodiments, rotation of the drive gear pin in a first circumferential direction about the first axis may drive translation of the lock pin toward the bridle opening. In various embodiments, rotation of the drive gear pin in a second circumferential direction about the first axis may drive translation of the lock pin away from the bridle opening. The second circumferential direction is opposite the first circumferential direction.

In various embodiments, the lock pin may include a platform portion and a rod portion extending from the platform portion. The platform portion may define the threaded open. In various embodiments, an alignment pin may be located in a pin opening defined by the platform portion of the lock pin.

In various embodiments, drogue bridle attachment assembly may further include a bushing configured to be received within the bridle opening. The bushing may define a bushing channel configured to receive the rod portion of the lock pin. The bushing may be configured to couple to an end of a bridle.

An ejection seat is also disclosed herein. In accordance with various embodiments, the ejection seat may comprise a seatback, a drogue parachute assembly located in an interior of the seatback, and a drogue bridle attachment assembly coupled to the seatback. The drogue parachute assembly may include a canopy and a bridle coupled to the canopy. The drogue bridle attachment assembly may comprise a housing mounted to the seatback, a lock pin configured to translate into a bridle opening defined by the housing, a jackscrew gear pin including a threaded portion and a gear portion, and a drive gear pin including a drive gear portion intermeshed with the gear portion of the jackscrew gear pin. The threaded portion of the jackscrew gear pin may be configured to engage a threaded opening in the lock pin.

In various embodiments, a bushing may be located in a loop formed by an end of the bridle. The bushing may define a bushing channel configured to receive the lock pin. In various embodiments, a head of the drive gear pin may define a tool opening, The tool opening may be oriented toward a front side of the seatback. In various embodiments, a flange located at the front side of the seatback may define a tool orifice. The tool orifice may be aligned with the tool opening in the head of the drive gear pin.

In various embodiments, the drive gear pin may be configured to rotate about a first axis, and the jackscrew gear pin may be configured to rotate about a second axis. The second axis may be approximately perpendicular to the first axis. In various embodiments, rotation of the drive gear pin in a first circumferential direction about the first axis may drive translation of the lock pin toward the bridle opening.

In various embodiments, the lock pin may include a platform portion and a rod portion extending from the platform portion. The platform portion may define the threaded open. In various embodiments, drogue bridle attachment assembly may further comprise an alignment pin located in a pin opening defined by the platform portion of the lock pin.

In various embodiments, a rocket catapult may be coupled to the seatback. The rocket catapult may be located between the bridle and a front side of the seatback.

A method for installing a drogue parachute assembly in an ejection seat is also disclosed herein. In accordance with various embodiments, the method may comprise the steps of locating a tractor rocket and a drogue canopy housing in a seatback of the ejection seat, locating a rocket catapult in a rocket catapult cavity defined by the seatback, and coupling a bridle to a drogue bridle attachment assembly after locating the rocket catapult in the rocket catapult cavity.

In various embodiments, the drogue bridle attachment assembly may comprise a housing mounted to the seatback, a lock pin configured to translate into a bridle opening defined by the housing, a jackscrew gear pin including a threaded portion and a gear portion, and a drive gear pin including a drive gear portion intermeshed with the gear portion of the jackscrew gear pin. The threaded portion of the jackscrew gear pin may be configured to engage a threaded opening in the lock pin.

In various embodiments, coupling the bridle to the drogue bridle attachment assembly may comprise locating a bushing coupled to an end of the bridle in the bridle opening of the housing, locating a tool through an orifice in the seatback and into a tool opening defined by a head of the drive gear pin, and translating the lock pin into the bushing by rotating the drive gear pin using the tool.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
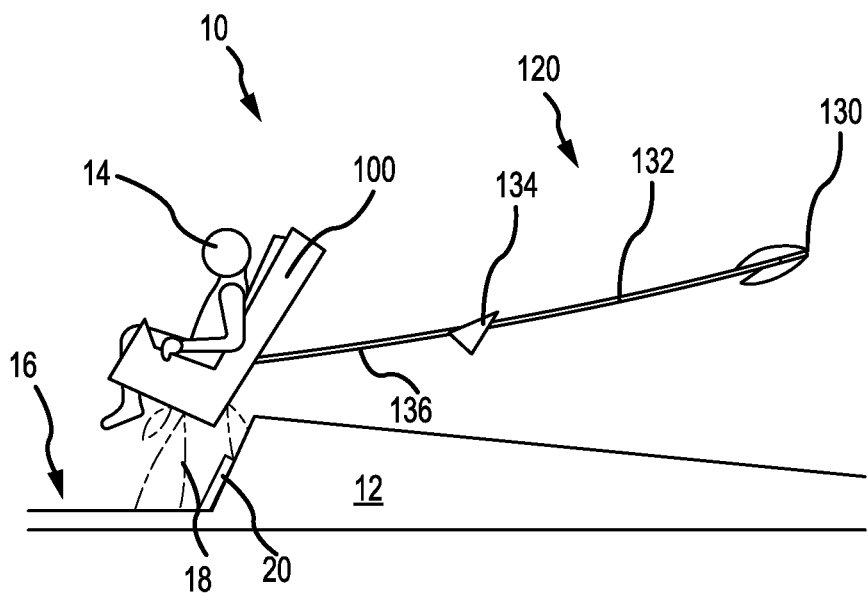
FIGS. 1A and 1B illustrate deployment of a drogue parachute in response to the expulsion of an ejection seat from an aircraft, in accordance with various embodiments.
Figure 1B:
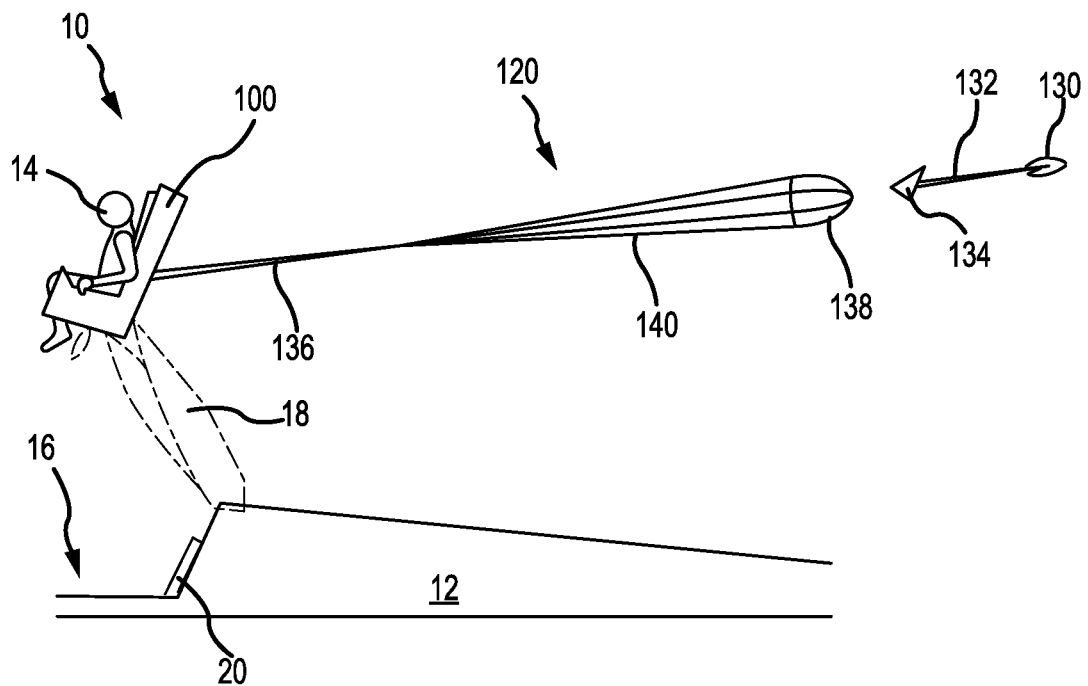

With reference to FIGS. 1A and 1B, an aircraft ejection system 10 is shown during deployment of the drogue parachute assembly. In accordance with various embodiments, aircraft ejection system 10 may be installed in an aircraft 12 to expel ejection seat 100 and an occupant 14 of ejection seat 100 from a cockpit 16 of aircraft 12. Ejection seat 100 may be urged from cockpit 16 by a propulsion system 18 (e.g., by a rocket catapult).

In accordance with various embodiments, ejection seat 100 includes drogue parachute assembly 120. Drogue parachute assembly 120 includes a tractor rocket 130, tow line 132, drogue canopy housing 134, and bridle 136. Tractor rocket 130 is configured to deploy (i.e., is fired). Drogue parachute assembly 120 is configured to deploy (i.e., fire) a tractor rocket 130 from ejection seat 100. Tractor rocket 130 may fire a predetermined time after initiation of the ejection sequence (e.g., after an ejection handle is pulled) and/or in response to another ejection event (e.g., in response to ejection seat 100 traveling over a switch located on a rail 20 in cockpit 16). Tow line 132 couples tractor rocket 130 to drogue canopy housing 134. The drogue canopy 138 and, at least, a portion of the drogue suspension lines 140 may be housed within drogue canopy housing 134. Bridle 136 couples the drogue suspension lines 140, and thus the drogue canopy 138, to ejection seat 100.

In accordance with various embodiments, the force generated by tractor rocket 130 pulls drogue canopy housing 134 away from ejection seat 100. As a distance between drogue canopy housing 134 and ejection seat 100 increases, the tension in bridle 136 and tow lines 132 begins to increase. The increase in tension in bridle 136, along with the continued translation of tractor rocket 130 away from the ejection seat 100, eventually pulls the drogue suspension lines 140 and the drogue canopy 138 from drogue canopy housing 134.

Figure 2:
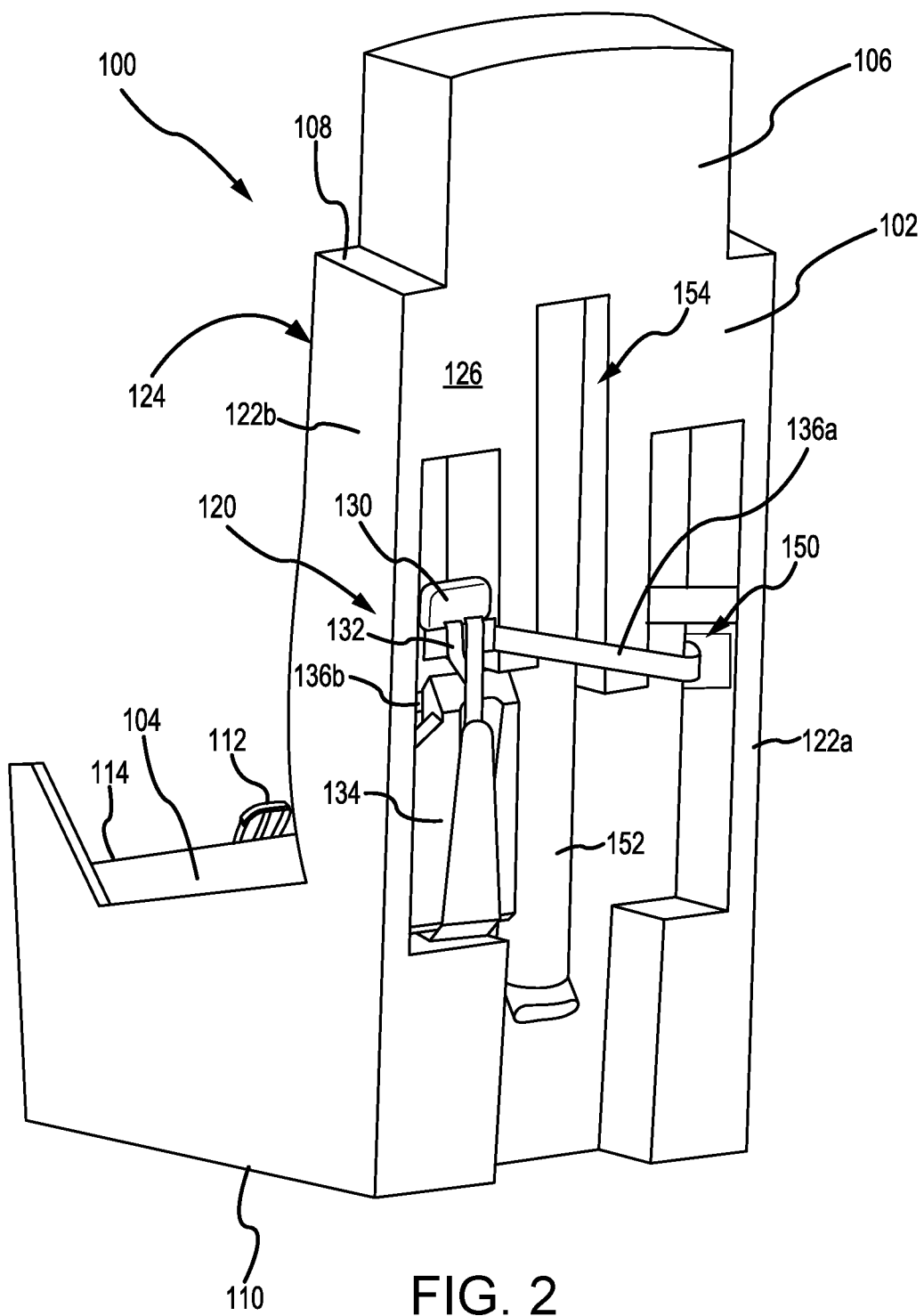
FIG. 2 illustrates a perspective view of a drogue parachute assembly stowed in the interior of an ejection seat seatback, in accordance with various embodiments.

With reference to FIG. 2, ejection seat 100 is illustrated with drogue parachute assembly 120 in the stowed position. In accordance with various embodiments, ejection seat 100 includes a seatback 102 and a seat pan 104. A head rest 106 may be located at an upper end 108 of seatback 102. Head rest 106 and upper end 108 are opposite a lower end 110 of seatback 102. In various embodiments, an ejection handle 112 may be located proximate a front side 114 of seat pan 104. Front side 114 of seat pan 104 is generally opposite, or distal, seatback 102. While FIG. 2 shows ejection handle 112 located at front side 114 of seat pan 104, it is further contemplated and understood that ejection handle 112 may be located anywhere that is accessible to an occupant of ejection seat 100. Ejection handle 112 may be configured to initiate an ejection sequence upon actuation. For example, the seat occupant pulling ejection handle 112 may cause ejection seat 100 to be expelled from the aircraft.

Ejection seat 100 includes drogue parachute assembly 120. Drogue parachute assembly 120 may be located within an interior of seatback 102. Stated differently, drogue parachute assembly 120 may be located in a volume defined by seatback 102. In this regard, drogue parachute assembly 120 may be located between a right (or first) sidewall 122a and a left (or second) sidewall 122b of seatback 102, between upper end 108 and lower end 110 of seatback 102, and between a front side 124 and a back side 126 of seatback 102.

In accordance with various embodiments, tractor rocket 130 is configured to deploy (i.e., is fired) from seatback 102. A right (or first) bridle 136a and left (or second) bridle 136b of drogue parachute assembly 120 couple the drogue suspension lines 140 (FIG. 1B), and thus the drogue canopy 138 (FIG. 1B), to ejection seat 100. Right bridle 136a may be coupled to right sidewall 122a. Left bridle 136b may be coupled to left sidewall 122b. In accordance with various embodiments, right bridle 136a may be coupled to right sidewall 122a via a drogue bridle attachment assembly 150. In accordance with various embodiments, drogue bridle attachment assembly 150 may be configured to receive and secure right bridle 136a after locating a rocket catapult 152 within the seatback 102. Rocket catapult 152 may be configured to expel ejection seat 100 from the aircraft. For example, propulsion system 18 in FIGS. 1A and 1B may include rocket catapult 152. Rocket catapult 152 may be located in a rocket catapult cavity 154 defined by seatback 102. Rocket catapult 152 may be located generally in the center of seatback 102. In this regard, rocket catapult 152 may be located approximately equal distance from right sidewall 122a and left sidewall 122b of seatback 102 and/or approximately equal distance from front side 124 and back side 126 of seatback 102. In accordance with various embodiments, attaching right bridle 136a after locating rocket catapult 152 within the seatback 102 may allow rocket catapult 152 to be located between right bridle 136a and front side 124 of seatback 102.

In accordance with various embodiments and as described in further detail herein, drogue bridle attachment assembly 150 includes a gear-drive configured to translate a lock pin of the drogue bridle attachment assembly 150 into and out a bushing connected to right bridle 136a. In accordance with various embodiments, drogue bridle attachment assembly 150 may be accessed from a tool orifice in the front side 124 of seatback 102. Accessing and/or controlling drogue bridle attachment assembly 150 from the front side of the ejection seat allows right bridle 136a to be secured after installing the seat within a cockpit, while the tool clearance orifice reduces the probability of drogue bridle attachment assembly 150 being inadvertently unlocked during aircrew ingress and egress.

Figure 3:
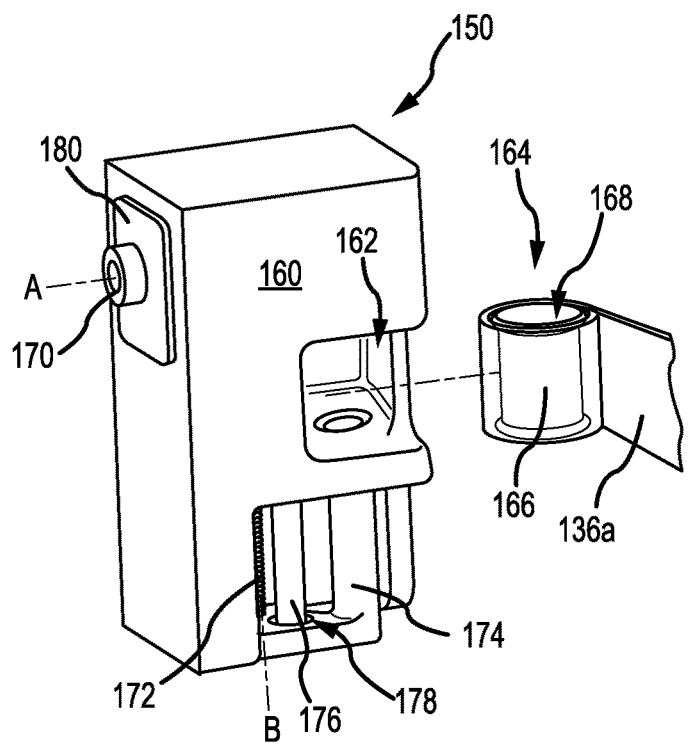
FIG. 3 illustrates a drogue bridle attachment assembly and an end of a drogue bridle, in accordance with various embodiments.

With reference to FIG. 3, additional details of drogue bridle attachment assembly 150 and right bridle 136a are illustrated. In accordance with various embodiments, drogue bridle attachment assembly 150 includes a housing 160. Housing 160 defines bridle opening 162 configured to receive a first end 164 of right bridle 136a. First end 164 of right bridle 136a may include a bushing 166. In this regard, bridle opening 162 configured to receive first end 164 and bushing 166. In various embodiments, bushing 166 may be located in a loop formed by first end 164 of right bridle 136a. Stated differently, first end 164 is located around and may surround bushing 166. Bushing 166 defines a bushing channel 168.

Drogue bridle attachment assembly 150 further includes a drive gear pin 170, a jackscrew gear pin 172, and a lock pin 174. As described in further detail below, rotation of drive gear pin 170 about an axis of rotation A is configured drive rotation of jackscrew gear pin 172 about an axis of rotation B. Rotation of jackscrew gear pin 172 about axis B in a first circumferential direction (e.g., clockwise) drives translation of lock pin 174 into bridle opening 162. Rotation of jackscrew gear pin 172 about axis B in a second, opposite circumferential direction (e.g., counterclockwise) drives translation of lock pin 174 away from bridle opening 162. In accordance with various embodiments, bridle opening 162 is configured such that locating first end 164 of right bridle 136a within bridle opening 162, aligns bushing channel 168 with lock pin 174. In this regard, when first end 164 of right bridle 136a is located in bridle opening 162, lock pin 174 may translate in and out of bushing channel 168.

In accordance with various embodiments, drogue bridle attachment assembly 150 may further include an alignment pin 176. In various embodiments, alignment pin 176 may extend from housing 160 into a pin opening 178 defined by lock pin 174. In various embodiments, alignment pin 176 may be integral to housing 160. Drogue bridle attachment assembly 150 may further include a cover plate 180. Cover plate 180 may be coupled to housing 160. Drive gear pin 170 may be located through cover plate 180. Cover plate 180 may prevent debris from entering housing 160.

Figure 4:
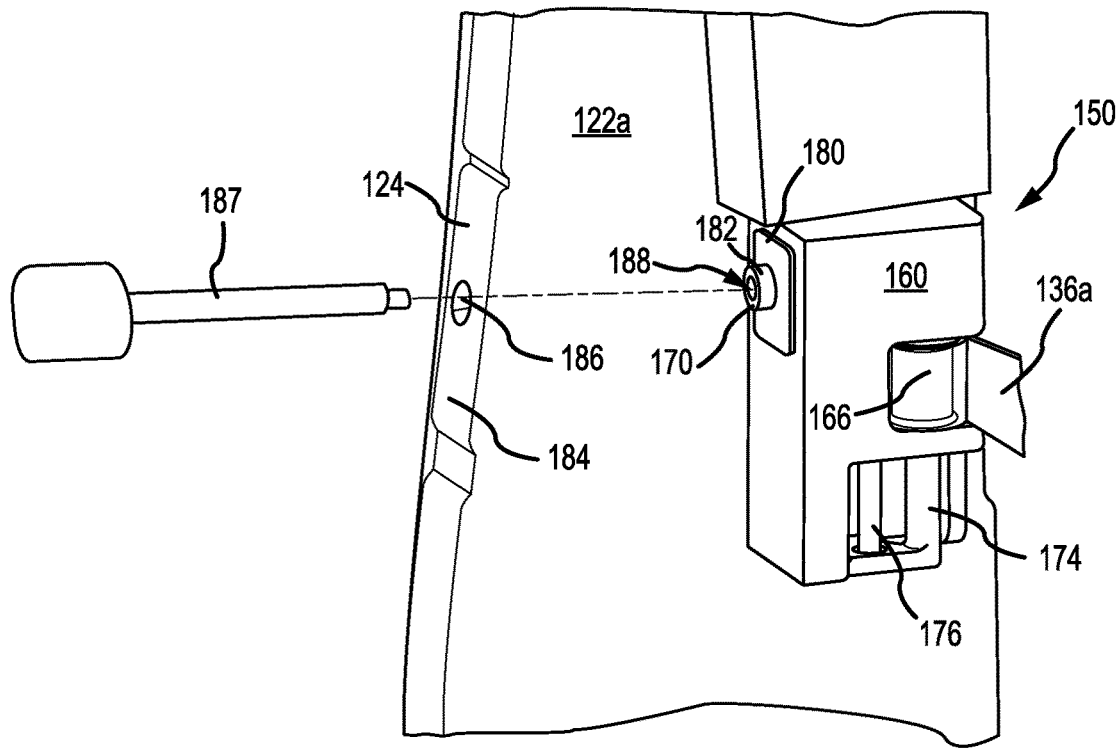
FIG. 4 illustrates the end of a drogue bridle located in a drogue bridle attachment assembly, in accordance with various embodiments.

With reference to FIG. 4, right bridle 136a is shown located in drogue bridle attachment assembly 150. In accordance with various embodiments, housing 160 may be secured (i.e., fastened or otherwise coupled) to right sidewall 122a. A head end 182 of drive gear pin 170 is oriented toward front side 124 of right sidewall 122a. A flange 184 may be located at front side 124 of right sidewall 122a. Flange 184 may define a tool orifice 186. Tool orifice 186 is aligned with head end 182 of drive gear pin 170. In accordance with various embodiments, a tool 187 configured to engage a tool opening 188 defined by head end 182 of drive gear pin 170 may be inserted through tool orifice 186, thereby allowing drive gear pin 170 to be accessed and rotated from the front side 124 of right sidewall 122a. While tool orifice 186 is illustrated as located at the front side 124 of right sidewall 122a, it is contemplated and understood that tool orifice 186 may be formed in other locations along seatback 102. In this regard, the location of tool orifice 186 is selected so to allow an installer to access tool opening 188 after the ejection seat is installed in an aircraft cockpit.

Figure 5A:
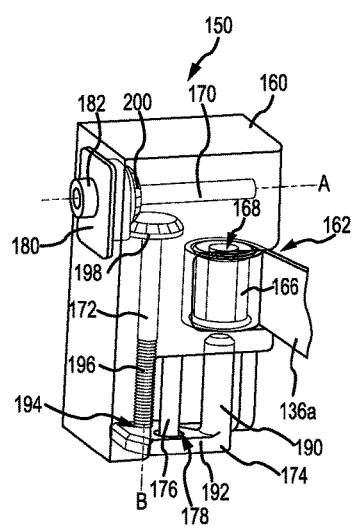
FIGS. 5A, 5B, and 5C illustrate a drogue bridle being coupled to a drogue bridle attachment assembly, in accordance with various embodiments.

With reference to FIG. 5A, right bridle 136a is shown located in drogue bridle attachment assembly 150 and with drogue bridle attachment assembly 150 in an unlocked position. In various embodiments, lock pin 174 includes a rod portion 190 and a platform portion 192. Rod portion 190 may extend from platform portion 192 in the direction of axis B. In this regard, rod portion 190 extends toward the axis of rotation A of drive gear pin 170. Platform portion 192 defines pin opening 178. In the unlocated position, rod portion 190 is located completely outside bushing channel 168. Stated differently, unlocated position, rod portion 190 is located outside (i.e., not within, external to) bridle opening 162.

Platform portion 192 further defines a threaded opening 194. Threaded opening 194 is configured to receive a threaded portion 196 of jackscrew gear pin 172. Jackscrew gear pin 172 further include a gear portion 198. In various embodiments, gear portion 198 includes a bevel gear. Gear portion 198 of jackscrew gear pin 172 is configured to engage (i.e., is intermeshed with) a drive gear portion 200 of drive gear pin 170. In various embodiments, drive gear portion 200 is a bevel gear. In accordance with various embodiments, rotation of drive gear portion 200, about axis A, in a first circumferential direction (e.g., clockwise) drives rotation of gear portion 198, and thus rotation of threaded portion 196, about axis B in the first circumferential direction. In various embodiments, axis B may be approximately perpendicular to axis A. As used in the previous context only, "approximately" means±10° from perpendicular. Rotation of threaded portion 196 in the first circumferential, drives translation of lock pin 174 in a direction parallel to axis B. In this regard, rotation of drive gear pin 170 in the first circumferential direction drives translation of lock pin 174 toward bridle opening 162.

Figure 5B:
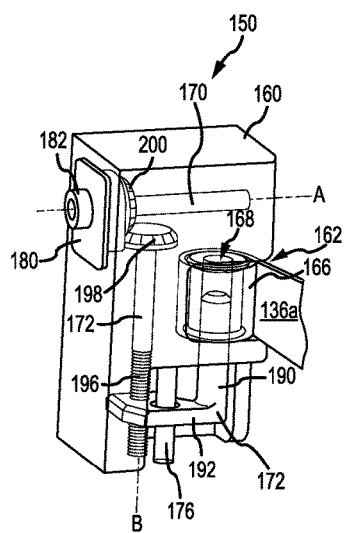

With reference to FIG. 5B, right bridle 136a is shown located in drogue bridle attachment assembly 150, with rod of lock pin 174 partially inserted into right bridle 136a. Continued rotation of drive gear portion 200, gear portion 198, and threaded portion 196 in the first circumferential, causes platform portion 192 of lock pin 174 to translate toward gear portion 198 of jackscrew gear pin 172 and rod portion 190 of lock pin 174 to translate into bushing channel 168.

Figure 5C:
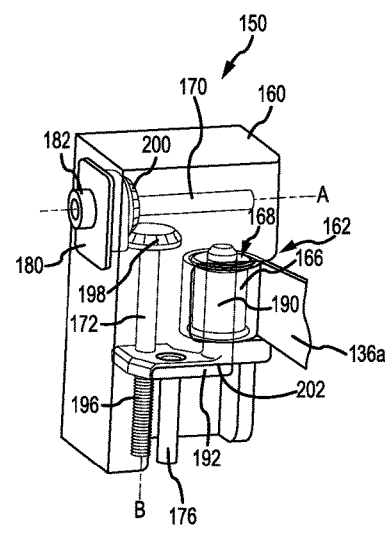

With reference to FIG. 5C, right bridle 136a is shown located in drogue bridle attachment assembly 150, with drogue bridle attachment assembly 150 in a locked position. Rotation of drive gear portion 200, gear portion 198, and threaded portion 196 in the first circumferential may continue until platform portion 192 contacts an interference surface 202 of housing 160. In the locked position, rod portion 190 is located with bushing channel 168. In the locked position, rod portion 190 of lock pin 174 generates an interference with the bushing 166 that secures right bridle 136a within housing 160. In this regard, the interference between rod portion 190 and bushing 166 blocks or otherwise prevents right bridle 136a from separating from housing 160, thereby securing right bridle 136a to right sidewall 122a of seatback 102, with momentary reference to FIG. 2.

In accordance with various embodiments, to unlock drogue bridle attachment assembly 150, drive gear portion 200 is rotated about axis A, in a second circumferential direction (e.g., counterclockwise). Rotation of drive gear portion 200 in the second circumferential direction drives rotation of gear portion 198, and thus rotation of threaded portion 196, about axis B in the second circumferential direction. Rotation of threaded portion 196 in the second circumferential, drives translation of lock pin 174 in a second direction parallel to axis B. Translation of lock pin 174 in the second direction translates platform portion 192 away from gear portion 198 and translates rod portion 190 out of bushing channel 168 and away from bridle opening 162.

Securing right bridle 136a via drogue bridle attachment assembly 150 could eliminate tacking the bridle to the seatback, which may decrease assembly time and decrease or eliminate a chance the bridle could be removed from the seatback or become tangled during the firing of the drogue assembly tractor rocket. While drogue bridle attachment assembly 150 is disclosed as being employed with a tractor rocket propelled drogue parachute, it is contemplated and understood that drogue bridle attachment assembly 150 may also be employed with a mortar propelled drogue parachute assembly.

Figure 6A:
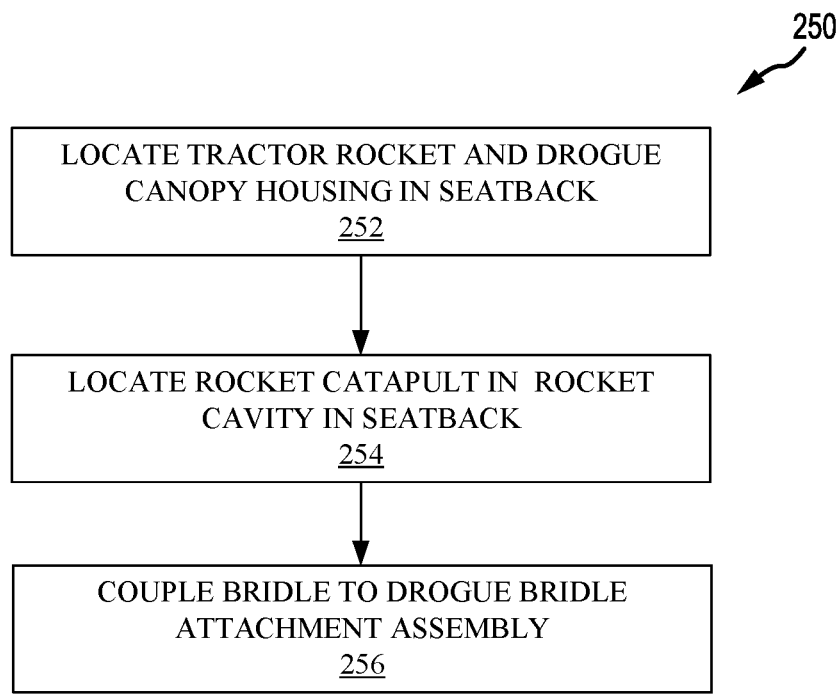
FIGS. 6A and 6B illustrate a method for installing a drogue parachute, in accordance with various embodiments.

With reference to FIG. 6A, a method 250 for installing a drogue parachute assembly in an ejection seat is illustrated. In accordance with various embodiments, method 250 may comprise locating a tractor rocket and a drogue canopy housing in a seatback of the ejection seat (step 252), locating a rocket catapult in a rocket catapult cavity defined by the seatback (step 254), and coupling a bridle to a drogue bridle attachment assembly (step 256). Step 256 may occur after step 254 (i.e., after locating the rocket catapult in the rocket catapult cavity).

Figure 6B:
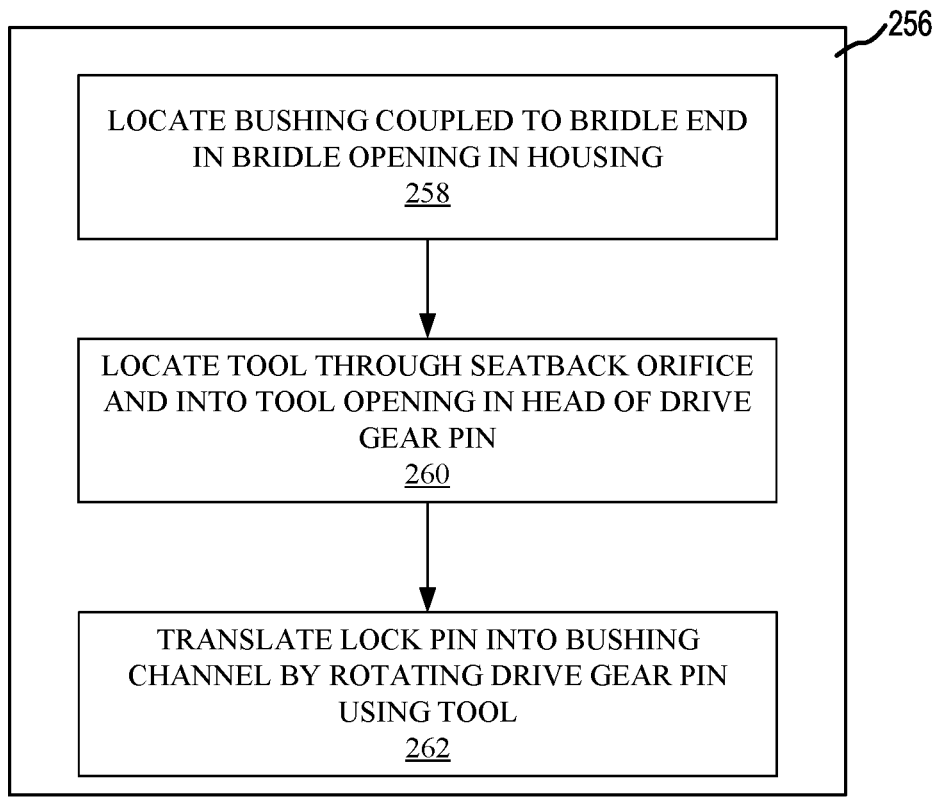

With reference to FIG. 6B, step 256 may comprise locating a bushing coupled to an end of the bridle in the bridle opening of the housing (step 258), locating a tool through an orifice in the seatback and into a tool opening defined by a head of the drive gear pin (step 260), and translating the lock pin into the bushing by rotating the drive gear pin using the tool (step 262).

With combined reference to FIG. 6A and FIG. 2, step 252 may comprise locating tractor rocket 130 and drogue canopy housing 134 in seatback 102 of ejection seat 100. Step 254 may include locating rocket catapult 152 in rocket catapult cavity 154. Step 256 may include coupling right bridle 136a to drogue bridle attachment assembly 150 after locating rocket catapult 152 in rocket catapult cavity 154.

With combined reference to FIG. 6B and FIG. 3, step 258 may comprise locating bushing 166, which is coupled to end 164 of right bridle 136a, in bridle opening 162 of housing 160. With combined reference to FIG. 6B and FIG. 4, step 260 may include locating tool 187 through tool orifice 186 and into tool opening 188 in head end 182 of drive gear pin 170. Step 262 may include translating lock pin 174 into bushing 166 by rotating drive gear pin 170 using the tool 187.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drogue bridle attachment assembly, comprising:
   a housing defining a bridle opening;
   a lock pin configured to translate into the bridle opening, the lock pin includes a platform portion and a rod portion extending from the platform portion, the platform portion defines a threaded opening;
   an alignment pin located in a pin opening defined by the platform portion of the lock pin;
   a jackscrew gear pin including a threaded portion and a gear portion, wherein the threaded portion is configured to engage the threaded opening in the lock pin;
   a drive gear pin including a drive gear portion intermeshed with the gear portion of the jackscrew gear pin; and
   a bushing configured to be received within the bridle opening, wherein the bushing defines a bushing channel configured to receive the rod portion of the lock pin, and wherein the bushing is configured to couple to an end of a bridle.

2. The drogue bridle attachment assembly of claim 1, wherein the drive gear pin is configured to rotate about a first axis, and wherein the jackscrew gear pin is configured to rotate about a second axis, the second axis being approximately perpendicular to the first axis.

3. The drogue bridle attachment assembly of claim 2, wherein a head of the drive gear pin defines a tool opening.

4. The drogue bridle attachment assembly of claim 3, wherein rotation of the drive gear pin in a first circumferential direction about the first axis is configured to drive translation of the lock pin toward the bridle opening.

5. The drogue bridle attachment assembly of claim 4, wherein rotation of the drive gear pin in a second circumferential direction about the first axis is configured to drive translation of the lock pin away from the bridle opening, the second circumferential direction being opposite the first circumferential direction.

6. An ejection seat, comprising:
   a seatback;
   a drogue parachute assembly located in an interior of the seatback, the drogue parachute assembly including a canopy and a bridle coupled to the canopy; and
   a drogue bridle attachment assembly coupled to the seatback, the drogue bridle attachment assembly comprising:
   a housing mounted to the seatback;
   a lock pin configured to translate into a bridle opening defined by the housing;
   a jackscrew gear pin including a threaded portion and a gear portion, wherein the threaded portion is configured to engage a threaded opening in the lock pin;
   a drive gear pin including a drive gear portion intermeshed with the gear portion of the jackscrew gear pin; and
   a bushing located in a loop formed by an end of the bridle, wherein the bushing defines a bushing channel configured to receive the lock pin.

7. The ejection seat of claim 6, wherein a head of the drive gear pin defines a tool opening, and wherein the tool opening is oriented toward a front side of the seatback.

8. The ejection seat of claim 7, wherein a flange located at the front side of the seatback defines a tool orifice, and wherein the tool orifice is aligned with the tool opening in the head of the drive gear pin.

9. The ejection seat of claim 8, wherein the drive gear pin is configured to rotate about a first axis, and wherein the jackscrew gear pin is configured to rotate about a second axis, the second axis being approximately perpendicular to the first axis.

10. The ejection seat of claim 9, wherein rotation of the drive gear pin in a first circumferential direction about the first axis is configured to drive translation of the lock pin toward the bridle opening.

11. The ejection seat of claim 6, wherein the lock pin includes a platform portion and a rod portion extending from the platform portion, and wherein the platform portion defines the threaded open.

12. The ejection seat of claim 11, wherein the drogue bridle attachment assembly further comprises an alignment pin located in a pin opening defined by the platform portion of the lock pin.

13. The ejection seat of claim 6, further comprising a rocket catapult coupled to the seatback, wherein the rocket catapult is located between the bridle and a front side of the seatback.

14. A method for installing a drogue parachute assembly in an ejection seat, comprising:
   locating a tractor rocket and a drogue canopy housing in a seatback of the ejection seat;
   locating a rocket catapult in a rocket catapult cavity defined by the seatback; and
   coupling a bridle to a drogue bridle attachment assembly after locating the rocket catapult in the rocket catapult cavity, the drogue bridle attachment assembly comprises:
   a housing mounted to the seatback;
   a lock pin configured to translate into a bridle opening defined by the housing;
   a jackscrew gear pin including a threaded portion and a gear portion, wherein the threaded portion is configured to engage a threaded opening in the lock pin; and
   a drive gear pin including a drive gear portion intermeshed with the gear portion of the jackscrew gear pin,
   wherein coupling the bridle to the drogue bridle attachment assembly comprises:
   locating a bushing coupled to an end of the bridle in the bridle opening of the housing;
   locating a tool through an orifice in the seatback and into a tool opening defined by a head of the drive gear pin; and
   translating the lock pin into the bushing by rotating the drive gear pin using the tool.

* * * * *